US012004233B2

(12) United States Patent
Jeong et al.

(10) Patent No.: US 12,004,233 B2
(45) Date of Patent: Jun. 4, 2024

(54) METHOD AND APPARATUS FOR RANDOM ACCESS IN NTN

(71) Applicant: Samsung Electronics Co., Ltd., Suwon-si (KR)

(72) Inventors: Kyeongin Jeong, Allen, TX (US); Nishithkumar D. Tripathi, Parker, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 17/500,839

(22) Filed: Oct. 13, 2021

(65) Prior Publication Data

US 2022/0124834 A1 Apr. 21, 2022

Related U.S. Application Data

(60) Provisional application No. 63/092,915, filed on Oct. 16, 2020.

(51) Int. Cl.
*H04W 74/0833* (2024.01)
*H04W 28/02* (2009.01)
(Continued)

(52) U.S. Cl.
CPC ... *H04W 74/0841* (2013.01); *H04W 28/0226* (2013.01); *H04W 56/005* (2013.01);
(Continued)

(58) Field of Classification Search
None
See application file for complete search history.

(56) References Cited

U.S. PATENT DOCUMENTS

| 2010/0260136 | A1* | 10/2010 | Fan | H04W 72/0453 |
| | | | | 370/330 |
| 2011/0170503 | A1* | 7/2011 | Chun | H04W 74/006 |
| | | | | 370/329 |

(Continued)

FOREIGN PATENT DOCUMENTS

CN 108633050 B 2/2020

OTHER PUBLICATIONS

International Search Report and Written Opinion dated Jan. 25, 2022 regarding International Application No. PCT/KR2021/014467, 8 pages.

(Continued)

*Primary Examiner* — San Htun

(57) ABSTRACT

Methods and apparatuses of UE for performing random access procedures in NTN. A method of a UE comprises: identifying configuration information including a first and second set of resources for a RACH operation; determining whether current location information of the UE is valid for the RACH operation; selecting the first set of resources based on a determination that the current location information of the UE is valid; selecting the second set of resources based on a determination that the current location information of the UE is invalid; transmitting a RACH preamble on the selected first or second set of resources; and receiving, in response to transmitting the RACH preamble, a RAR MAC PDU. The RAR MAC PDU includes a MAC subPDU comprising a first format of MAC subPDU associated with the first set of resources and a second format of MAC subPDU associated with the second set of resources.

20 Claims, 12 Drawing Sheets

(51) Int. Cl.
*H04W 56/00* (2009.01)
*H04W 72/02* (2009.01)
*H04W 72/51* (2023.01)
*H04W 74/08* (2009.01)
*H04W 80/02* (2009.01)

(52) U.S. Cl.
CPC ........... *H04W 72/02* (2013.01); *H04W 72/51* (2023.01); *H04W 74/0866* (2013.01); *H04W 80/02* (2013.01)

(56) References Cited

U.S. PATENT DOCUMENTS

| | | | |
|---|---|---|---|
| 2014/0044108 A1 | 2/2014 | Earnshaw et al. | |
| 2014/0126530 A1* | 5/2014 | Siomina | H04L 5/0073 370/330 |
| 2015/0304999 A1 | 10/2015 | Rune | |
| 2016/0073292 A1* | 3/2016 | Fan | H04W 74/0833 370/230 |
| 2018/0020432 A1* | 1/2018 | Rico Alvarino | H04W 8/22 |
| 2018/0049124 A1 | 2/2018 | Yi et al. | |
| 2019/0075503 A1* | 3/2019 | Bae | H04W 52/48 |
| 2021/0029658 A1* | 1/2021 | Mahalingam | H04W 56/0045 |
| 2022/0191939 A1* | 6/2022 | Christoffersson | H04W 56/0045 |

OTHER PUBLICATIONS

Techplayon, "5G NR—Msg2 Random Access Response (RAR)—SA Mode", Jun. 2020, 5 pages. https://www.techplayon.com/5g-nr-msg2-random-access-response-rar-sa-mode/, Best Available Date: Jun. 20, 2020.

"3rd Generation Partnership Project; Technical Specification Group Radio Access Network; Solutions for NR to support non-terrestrial networks (NTN) (Release 16)", 3GPP TR 38.821 V16.0.0, Dec. 2019, 140 pages.

"5G; NR; Radio Resource Control (RRC); Protocol specification (3GPP TS 38.331 version 16.2.0 Release 16)", ETSI TS 138 331 V16.2.0, Nov. 2020, 908 pages.

"3rd Generation Partnership Project; Technical Specification Group Radio Access Network; NR; Medium Access Control (MAC) protocol specification (Release 16)", 3GPP TS 38.321 V16.2.0, Sep. 2020, 154 pages.

Extended European Search Report issued Feb. 6, 2024 regarding Application No. 21880634.7, 8 pages.

* cited by examiner

- Common TA (Tcom) = 2*D0/c
- UE specific differential TA for xth UE (TUEx) = 2*(D1x-D0)/c
- Full TA (Tfull) = Tcom + TUEx (a) Regenerative payload

- Common TA (Tcom) = 2*(D01+D02)/c
- UE specific differential TA for xth UE (TUEx) = 2*(D1x-D01)/c
- Full TA (Tfull) = Tcom + TUEx (b) Transparent payload

METHOD AND APPARATUS FOR RANDOM ACCESS IN NTN

CROSS-REFERENCE TO RELATED APPLICATIONS AND CLAIM OF PRIORITY

The present application claims priority to U.S. Provisional Patent Application No. 63/092,915, filed on Oct. 16, 2020. The content of the above-identified patent document is incorporated herein by reference.

TECHNICAL FIELD

The present disclosure relates generally to wireless communication systems and, more specifically, the present disclosure relates to random access procedures in a non-terrestrial network (NTN).

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to random access procedures in an NTN.

In one embodiment, a user equipment (UE) in a wireless communication system is provided. The UE comprises a processor configured to: identify configuration information including a first set of resources and a second set of resources for a random access channel (RACH) operation, determine whether current location information of the UE is valid for the RACH operation, select the first set of resources based on a determination that the current location information of the UE is valid, and select the second set of resources based on a determination that the current location information of the UE is invalid. The UE further comprises a transceiver operably coupled to the processor, the transceiver configured to: transmit a RACH preamble on the selected first or second set of resources, and receive, in response to transmitting the RACH preamble, a random access response (RAR) medium access control protocol data unit (MAC PDU) (RAR MAC PDU), wherein the RAR MAC PDU includes a MAC subPDU comprising a first format of MAC subPDU associated with the first set of resources and a second format of MAC subPDU associated with the second set of resources.

In another embodiment, a method of a UE is provided. The method comprises: identifying configuration information including a first set of resources and a second set of resources for a RACH operation; determining whether current location information of the UE is valid for the RACH operation; selecting the first set of resources based on a determination that the current location information of the UE is valid; selecting the second set of resources based on a determination that the current location information of the UE is invalid; transmitting a RACH preamble on the selected first or second set of resources; and receiving, in response to transmitting the RACH preamble, a RAR MAC PDU, wherein the RAR MAC PDU includes a MAC subPDU comprising a first format of MAC subPDU associated with the first set of resources and a second format of MAC subPDU associated with the second set of resources.

In yet another embodiment, a base station (BS) in a wireless communication system is provided, the BS comprises a processor configured to generate configuration information including a first set of resources and a second set of resources for a RACH operation, The BS further comprises a transceiver configured to: transmit the configuration information including the first set of resources and the second set of resources for the RACH operation; receive a RACH preamble on the first or second set of resources; and transmit, in response to receiving the RACH preamble, a RAR MAC PDU, wherein the RAR MAC PDU includes a MAC subPDU comprising a first format of MAC subPDU associated with the first set of resources and a second format of MAC subPDU associated with the second set of resources, and wherein the first set of resources is selected when current location information of a UE is valid and the second set of resources is selected when the current location information of the UE is invalid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.821 v.16.0.0, "Solutions for NR to support non-terrestrial networks (NTN)"; 3GPP TS 38.331 v.16.2.0, "Radio Resource Control (RRC) protocol specification"; and 3GPP TS 38.321 v.16.2.0, "Medium Access Control (MAC) protocol specification."

Figure 1:
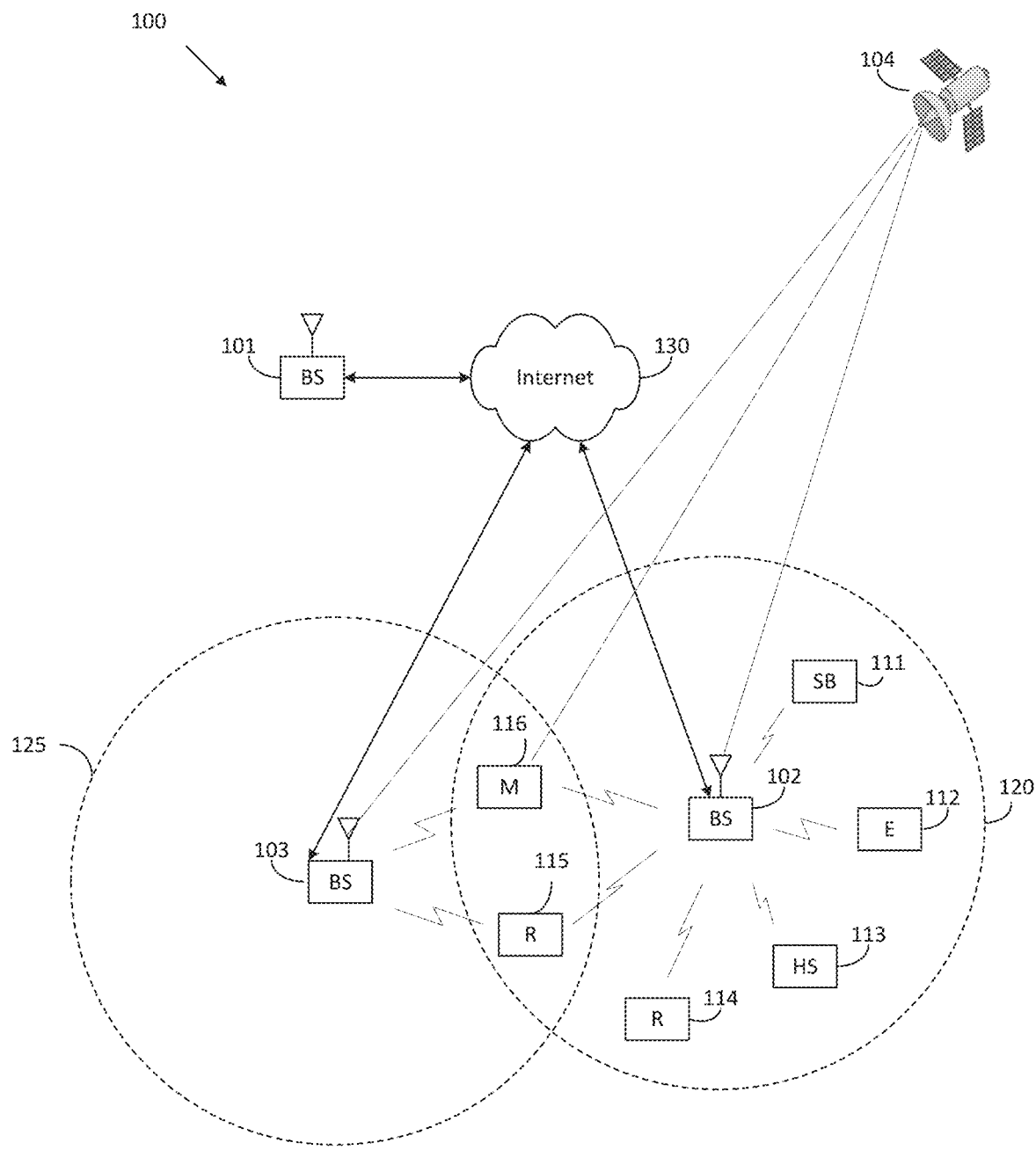
FIG. 1 illustrates an example wireless network according to embodiments of the present disclosure.
Figure 2:
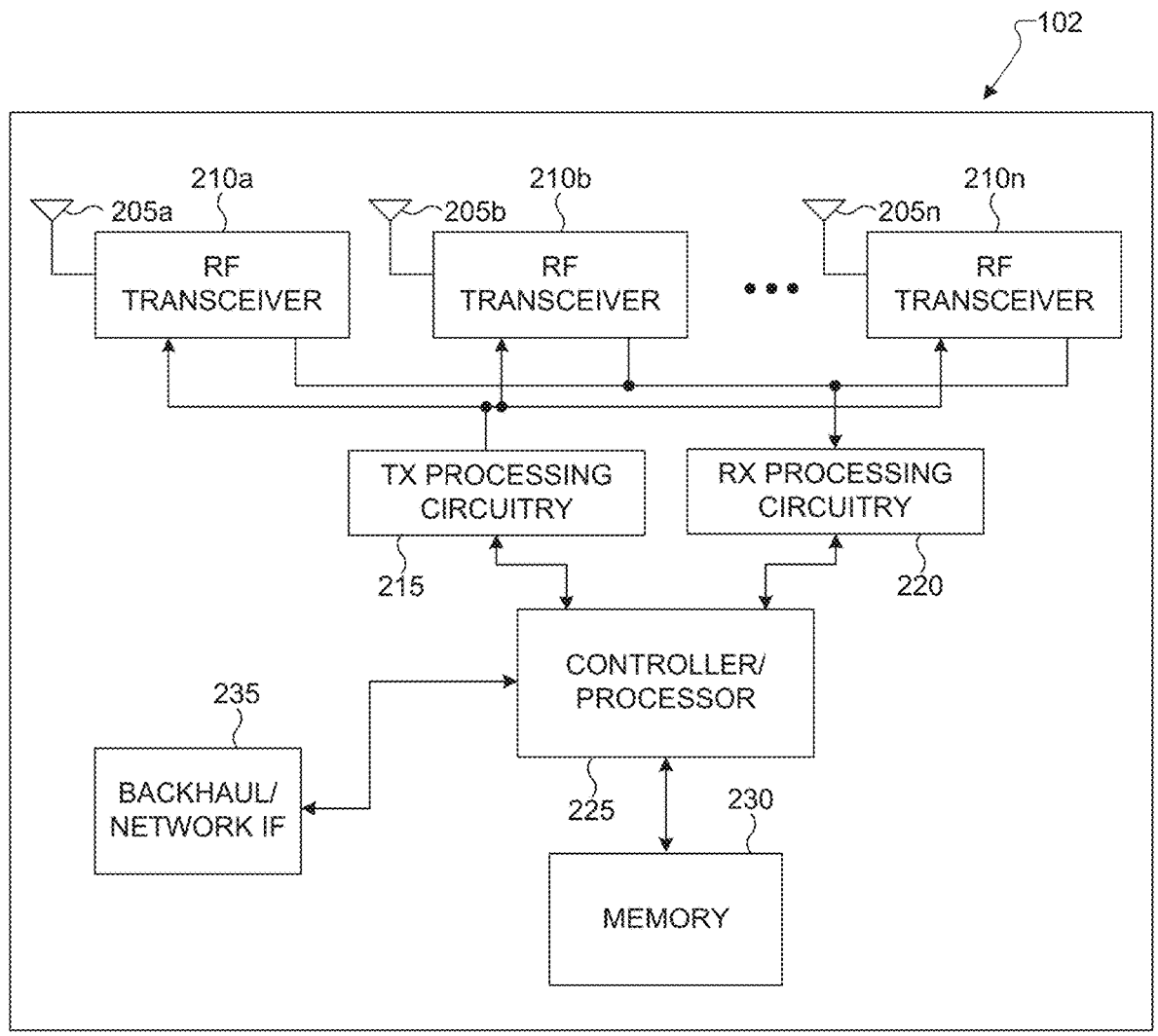
FIG. 2 illustrates an example gNB according to embodiments of the present disclosure.
Figure 3:
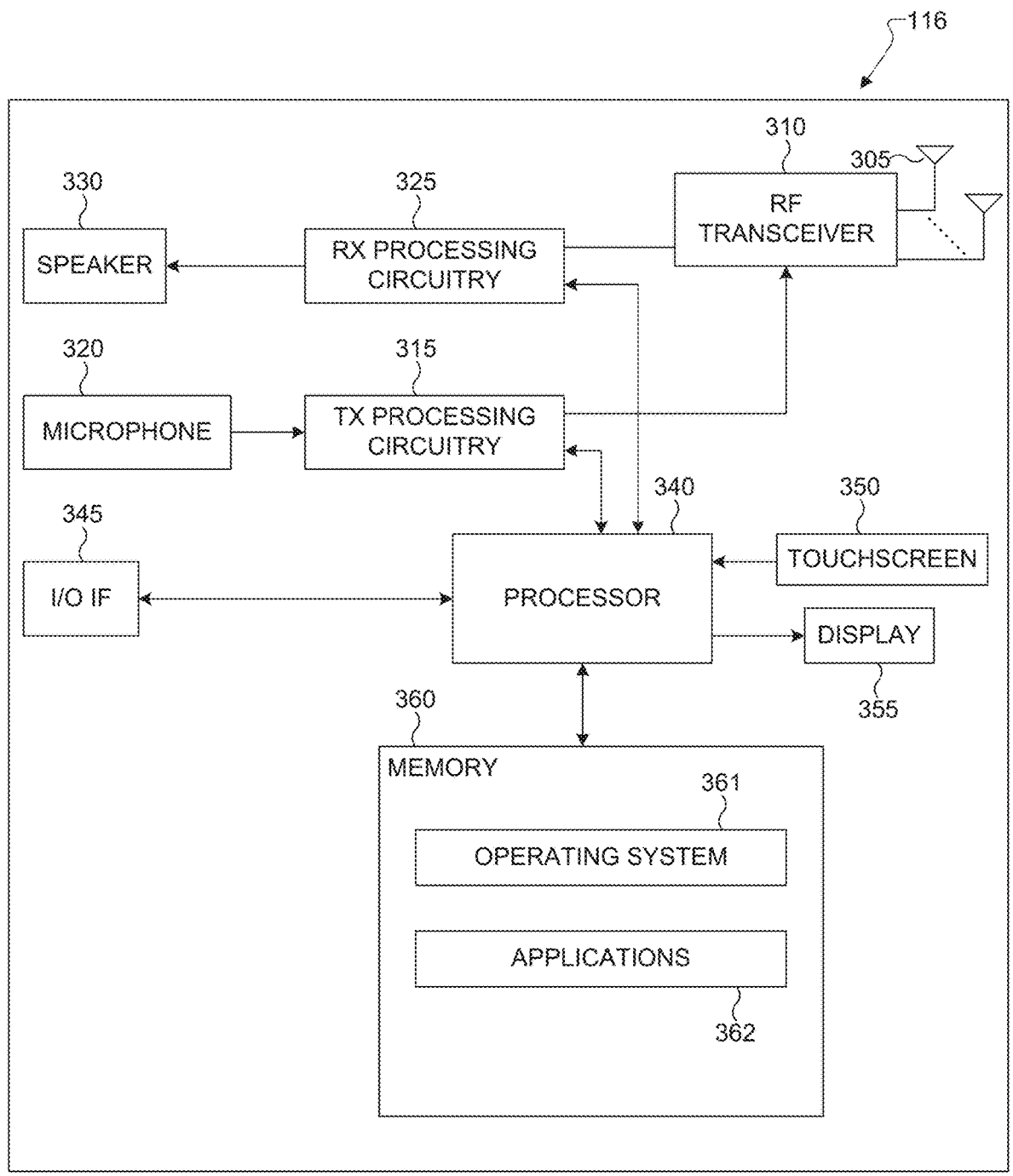
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for random access procedures in NTN. In certain embodiments, and one or more of the gNBs 101-103 includes circuitry, programing, or a combination thereof, for random access procedures in NTN. Further, the network 100 could be an NTN in which one or more of the gNBs 101-103 are replaced by or receive network access via a non-terrestrial node such as a satellite.

As discussed in greater detail below, the wireless network 100 may have communications facilitated via one or more communication satellite(s) 104 that may be in orbit over the earth. The communication satellite(s) 104 can communicate directly with the BSs 102 and 103 to provide network access, for example, in situations where the BSs 102 and 103 are remotely located or otherwise in need of facilitation for network access connections beyond or in addition to traditional fronthaul and/or backhaul connections. Various of the UEs (e.g., as depicted by UE 116) may be capable of at least some direct communication and/or localization with the communication satellite(s) 104, for example, to receive positional information or coordinates.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection (e.g., a wireless network link including a non-terrestrial node). When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support random access procedures in NTN. For example, the gNB 102 may be or may receive network access via a non-terrestrial node such as a satellite. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for random access procedures in NTN. For example, in various embodiments, the UE 116 may communicate directly or indirectly with a non-terrestrial node such as a satellite. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
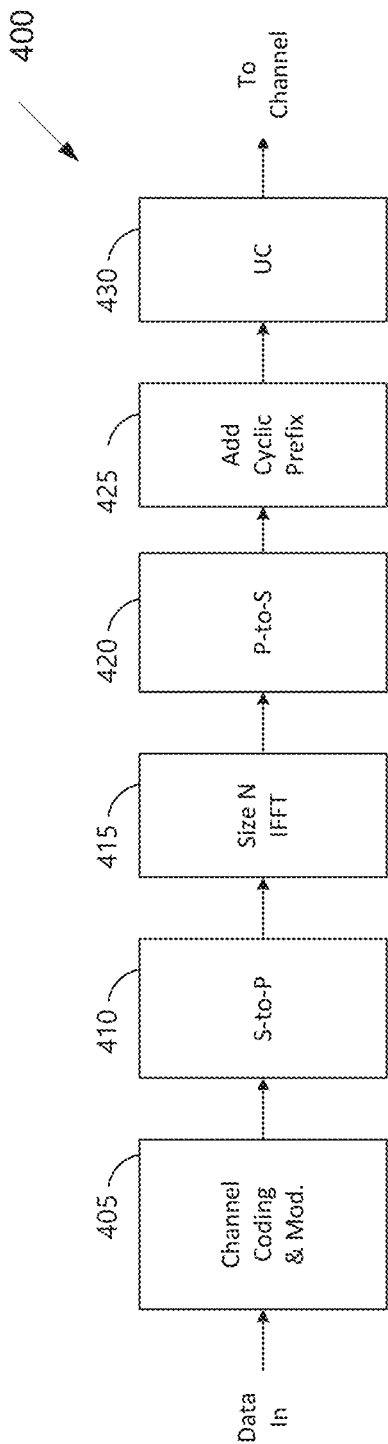
FIGS. 4 and 5 illustrate example wireless transmit and receive paths according to this disclosure.
Figure 5:
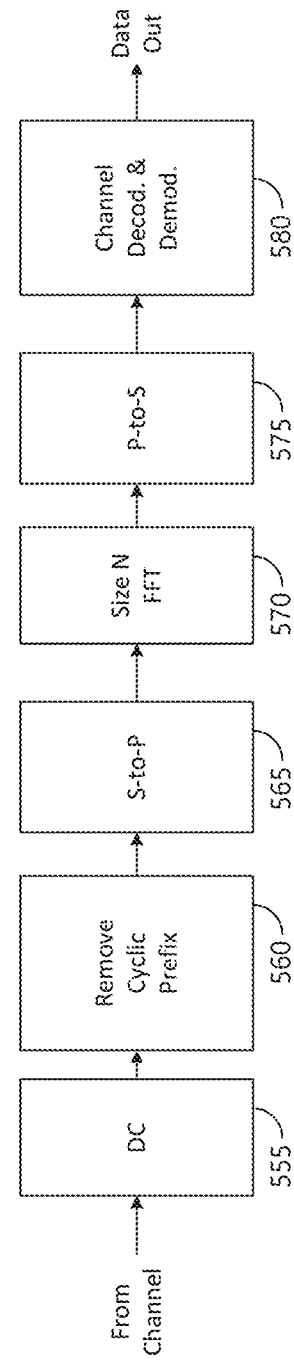

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support SIB based cell changes in NTN as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6:
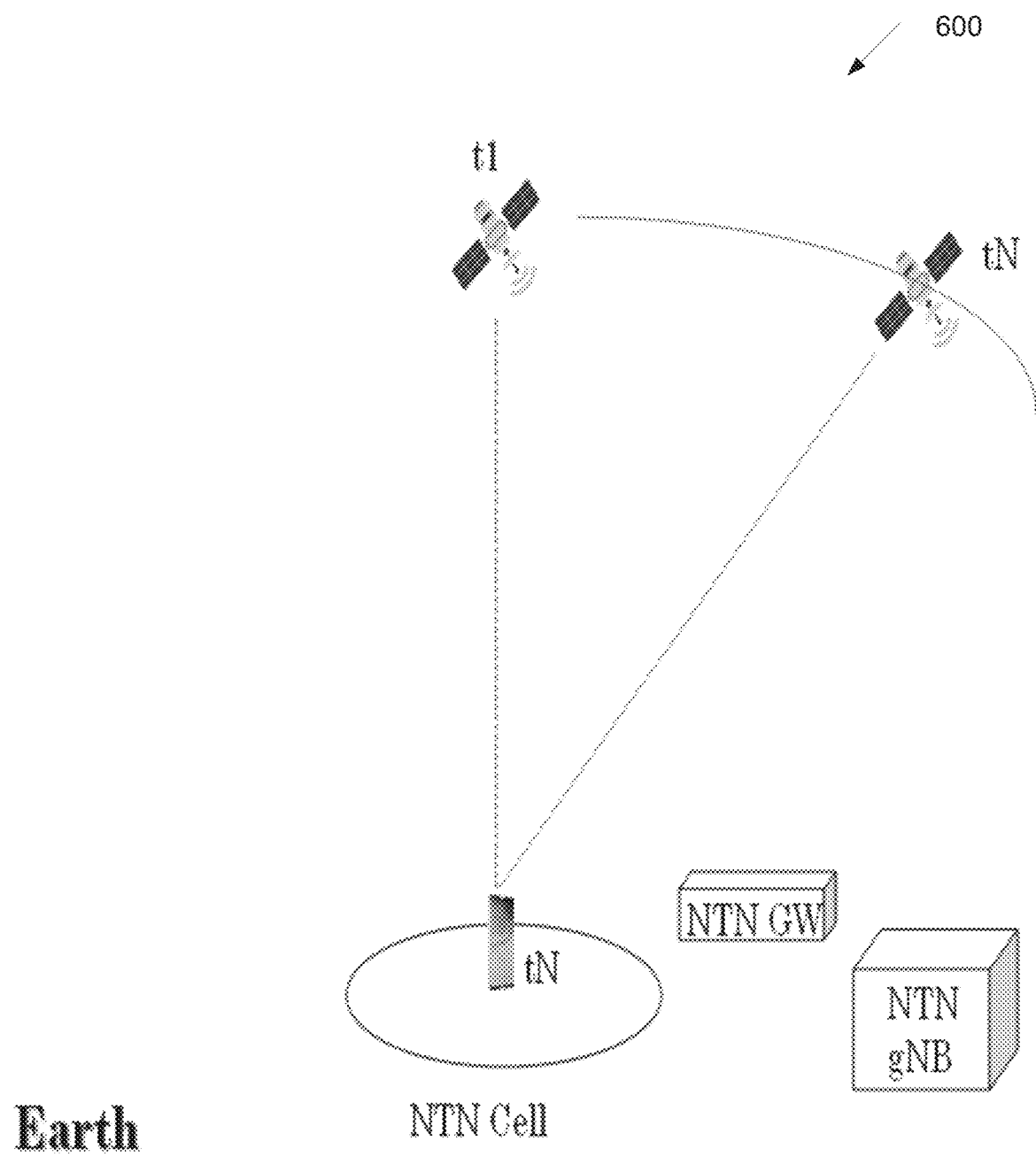
FIG. 6 illustrates an example NTN configuration according to embodiments of the present disclosure.

FIG. 6 illustrates an example NTN configuration 600 according to an embodiment of the present disclosure. The embodiment of the example of NTN configuration 600 illustrated in FIG. 6 is for illustration only. FIG. 6 does not limit the scope of this disclosure to any particular implementation of the example of NTN configuration 600.

As illustrated in FIG. 6, specifically, the UE is attempting to estimate its distance from the aerial/space-borne platform (e.g., a satellite) in NTN. Such distance estimate can then be used to do any timing pre-compensation at the UE. This knowledge can also be used to determine, report and use a suitable timing advance.

The aerial/space-borne platform acquires its own GNSS-based position at time t1. This information reaches a gNB via an NTN gateway. The gNB places the satellite's (potentially transformed position) in suitable system information (SI). The UE receives the satellites position at time tN and can now compare the satellite's position with its own position at time tN. While FIG. 6 shows the aerial/space-borne platform moving from left to right, such platform may also be stationary with respect to a point on the Earth's surface.

Figure 7:
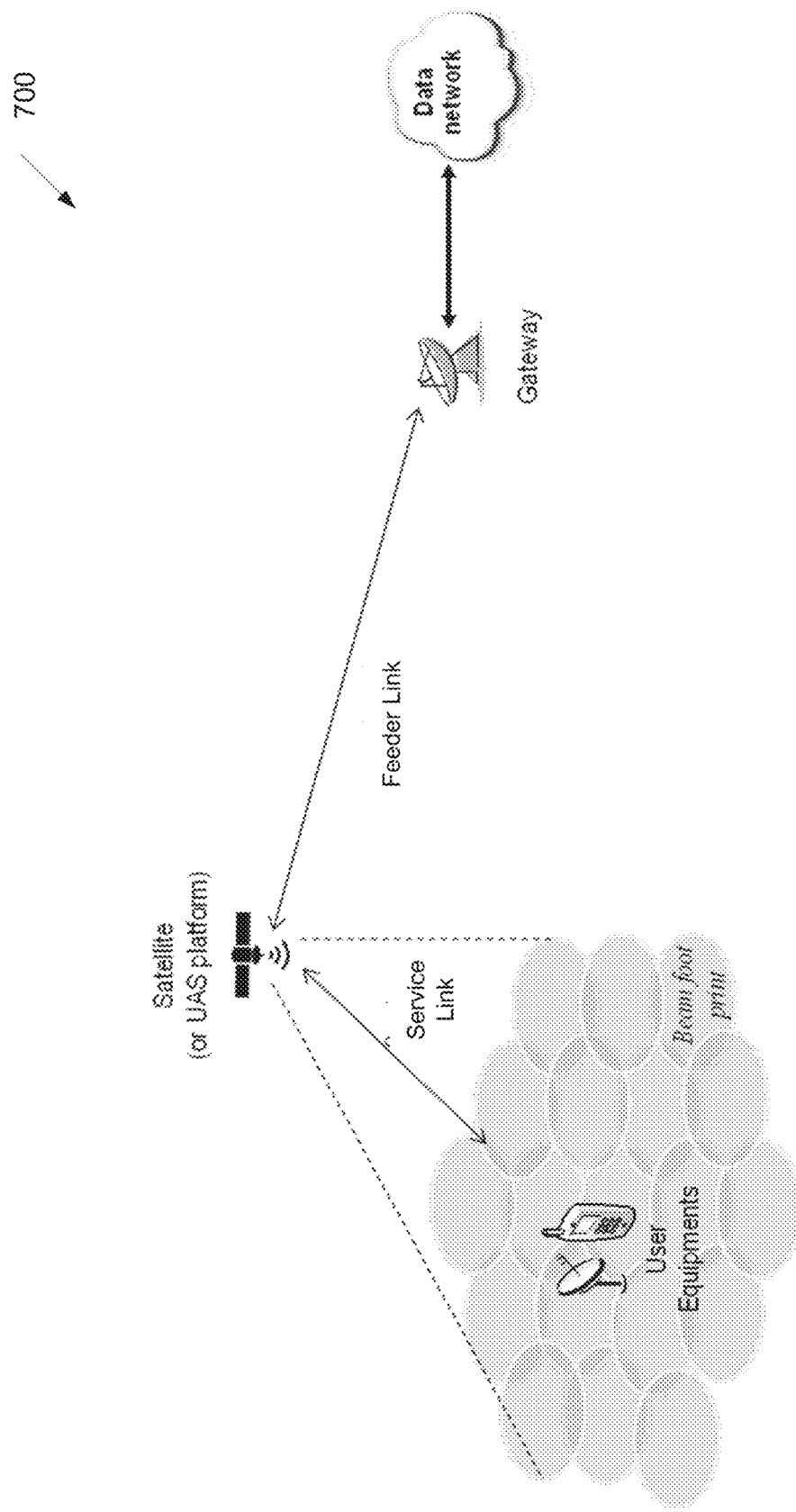
FIG. 7 illustrates an example NTN communication according to embodiments of the present disclosure.

FIG. 7 illustrates an example NTN communication network 700 according to embodiments of the present disclosure. For example, the NTN communication network 700 may be implemented in the network 700 in FIG. 7. An embodiment of the NTN communication network 700 shown in FIG. 7 is for illustration only.

In 3rd generation partnership project (3GPP) wireless standards, a new radio access technology (NR) is discussed as 5G wireless communication technology. One of NR features under the discussion is NTN. An NTN refers to a network, or segment of networks using RF resources on board a satellite (or unmanned aircraft system (UAS) platform) as shown in FIG. 7.

NTN typically features the following elements: (1) one or several satellite-gateways that connect the Non-Terrestrial Network to a public data network; (2) a GEO satellite fed by one or several satellite-gateways which are deployed across the satellite targeted coverage (e.g., regional or even continental coverage). It may be assumed that a UE in a cell is served by only one satellite-gateway; (3) a non-GEO satellite served successively by one or several satellite-gateways at a time. The system ensures service and feeder link continuity between the successive serving satellite-gateways with sufficient time duration to proceed with mobility anchoring and hand-over; (4) a feeder link or radio link between a satellite-gateway and the satellite (or UAS platform); (5) a service link or radio link between the user equipment and the satellite (or UAS platform); (6) a satellite (or UAS platform) which may implement either a transparent or a regenerative (with on board processing) payload. The satellite (or UAS platform) generates beams typically generate several beams over a given service area bounded by the field of view. The footprints of the beams are typically of elliptic shape. The field of view of a satellite (or UAS platform) depends on the on-board antenna diagram and min elevation angle; (7) a transparent payload: radio frequency filtering, Frequency conversion and amplification. Hence, the waveform signal repeated by the payload is un-changed; (8) a regenerative payload: radio frequency filtering, Frequency conversion and amplification as well as demodulation/decoding, switch and/or routing, coding/modulation. This is effectively equivalent to having all or part of base station functions (e.g., gNB) on board the satellite (or UAS platform); (9) inter-satellite links (ISL) optionally in case of a constellation of satellites. This may require regenerative payloads on board the satellites. ISL may operate in RF frequency or optical bands; and/or (10) UEs are served by the satellite (or UAS platform) within the targeted service area.

Maintenance of UL timing advance in NTN was discussed and UE autonomous acquisition of the timing advance (TA) at a UE when the UE knows location and satellite ephemeris was identified as one possible option in 3GPP standard specification.

In maintenance for UL timing advance and frequency synchronization, with consideration on the larger cell coverage, long round trip time (RTT), and high Doppler, enhancements are considered to ensure the performance for timing and frequency synchronization for a UL transmission.

Figure 8:
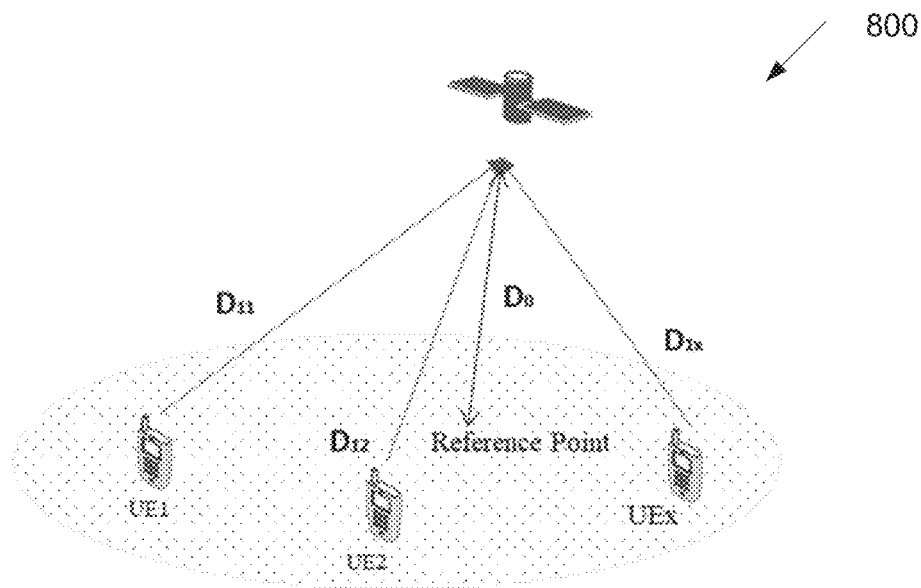
FIG. 8 illustrates an example TA components in NTN according to embodiments of the present disclosure.
Figure 8:
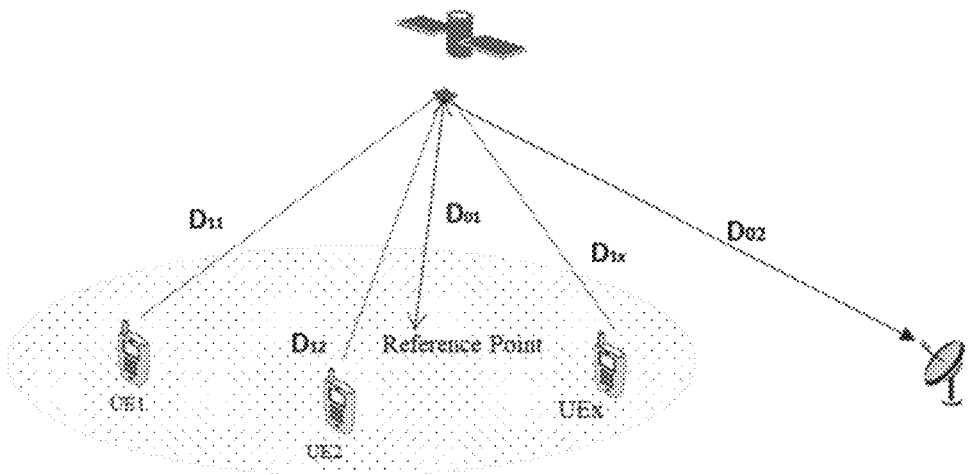

FIG. 8 illustrates an example TA components in NTN 800 according to embodiments of the present disclosure. An embodiment of the TA components in NTN 800 shown in FIG. 8 is for illustration only. Specifically, FIG. 8 illustrates regenerative payload (e.g., (a) of FIG. 8) and transparent payload (e.g., (b) of FIG. 8).

For the TA in the initial access and the subsequent TA maintenance, the following solutions are identified with an illustration of the definition of terminology given in FIG. 8.

In one example, autonomous acquisition of the TA at UE with UE known location and satellite ephemeris is provided. In such example, the required TA value for a UL transmission including physical random access channel (PRACH) can be calculated by the UE. The corresponding adjustment can be done, either with UE-specific differential TA or full TA (consisting of UE specific differential TA and common TA).

The full TA compensation at the UE side, both the alignment on the UL timing among UEs and DL and UL frame timing at network side can be achieved. However, in case of satellite with transparent payload, further discussion on how to handle the impact introduced by feeder link may be conducted in a normative work. Additional needs for the network to manage the timing offset between the DL and UL frame timing can be considered, if impacts introduced by a feeder link is not compensated by a UE in corresponding compensation The UE specific differential TA only, additional indication on a single reference point may be signalled to UEs per beam/cell for achieving the UL timing alignment among UEs within the coverage of the same beam/cell. Timing offset between DL and UL frame timing at the network side may also be managed by the network regardless of the satellite payload type.

With concern on the accuracy on the self-calculated TA value at the UE side, additional TA signalling from a network to a UE for TA refinement, e.g., during initial access and/or TA maintenance, can be determined in the normative work.

In one embodiment, location information (e.g., by GNSS/GPS signalling) may be available in order to derive UEs own location. However, even though the UE has GNSS/GPS capability, due to many reasons the UE may not have available location information (e.g., due to poor GNSS/GPS signalling, etc.) when the UE performs random access for UL TA acquisition. In such embodiment, a solution how to handle random access procedure is provided if UEs having available location information and UEs not having available location information co-exist in the cell.

Figure 9:
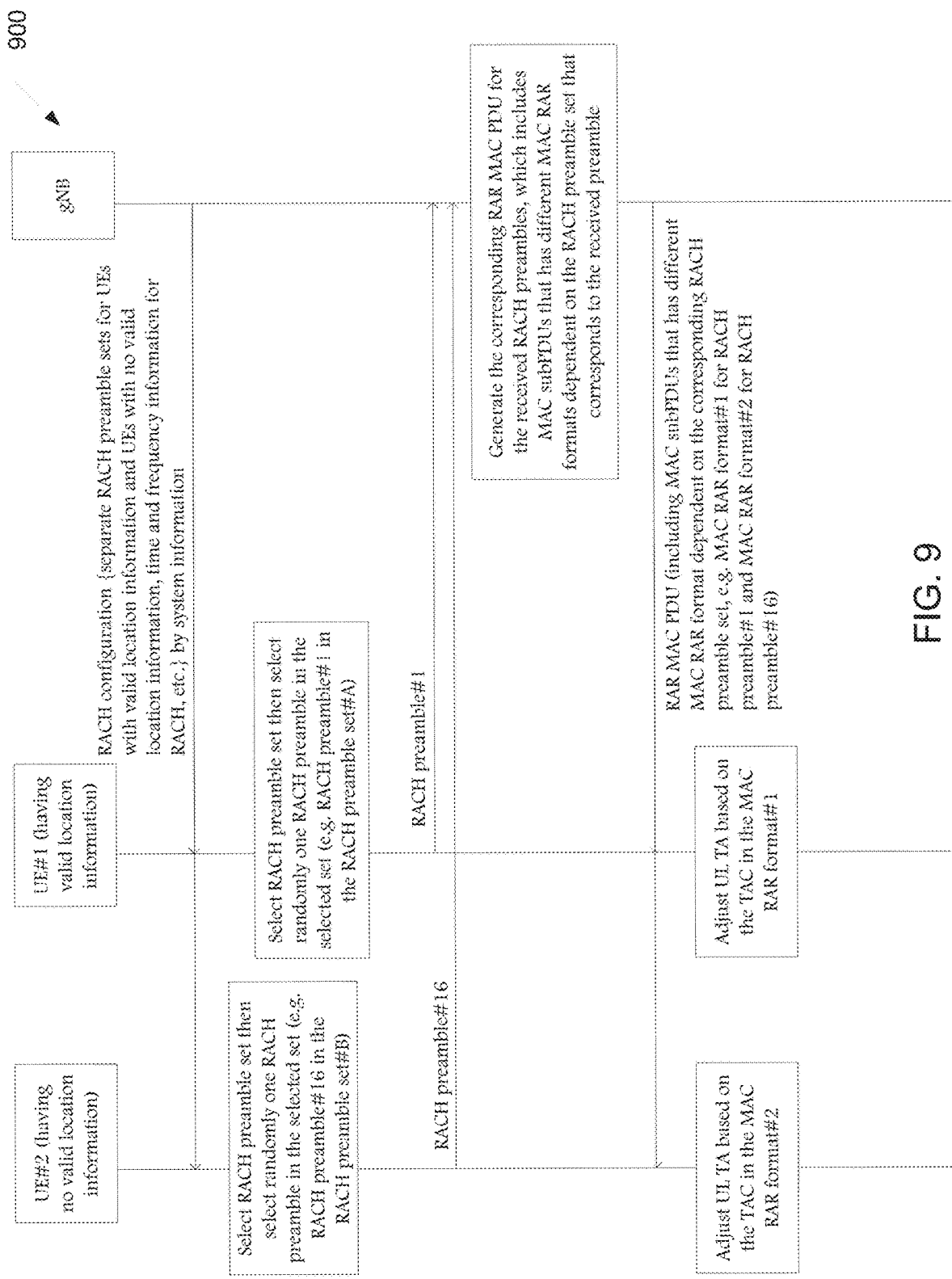
FIG. 9 illustrates a signaling flow for a random access in NTN according to embodiments of the present disclosure.

FIG. 9 illustrates a signaling flow 900 for a random access in NTN according to embodiments of the present disclosure. An embodiment of the signaling flow 900 shown in FIG. 9 is for illustration only.

As illustrated in FIG. 9, a gNB serving an NTN cell configures separate RACH preamble sets for the UEs having valid UE location information and the UEs having no valid UE location information by system information. For instance, the gNB can configure RACH preamble set #A including RACH preamble #1 to RACH preamble #N and RACH preamble set #B including RACH preamble #M to RACH preamble #(M+L).

In such instance, N, M, and L can be any integer value. RACH preamble set #A is configured for the UEs having valid UE location information and RACH preamble set #B is configured for the UEs having no valid UE location information (e.g., GNSS/GPS signalling is poor, no detection of GNSS/GPS signalling, etc.). Note RACH configuration can be also transmitted by dedicated RRC/MAC message (e.g., RRC connection reconfiguration message, new MAC CE message, etc.).

If the UEs in the cell receive the information and initiation of random access procedure is required (e.g., due to RRC connection (re)establishment from RRC idle/inactive state, etc.), first the UE checks if the valid location information (e.g., based on GNSS/GPS) is available or not. If the UE has valid location information available (for example UE #1), the UE selects RACH preamble set that was configured for the UEs having valid UE location information, e.g., in the above example, the UE selects RACH preamble set #A, then the UE randomly selects one of RACH preambles within the selected RACH preamble set, e.g., in the above example, the UE selects one of RACH preambles among RACH preamble #1 to RACH preamble #N.

It may be assumed that the UE #1 selects RACH preamble #1 from RACH preamble set #A for example. If the UE has no valid location information available (for example UE #2), the UE selects RACH preamble set that was configured for the UEs having no valid UE location information, e.g., in the above example, the UE selects RACH preamble set #B, then the UE randomly selects one of RACH preambles within the selected RACH preamble set, e.g., in the above example, the UE selects one of RACH preambles among RACH preamble #M to RACH preamble #(M+L).

It may be assumed that the UE #2 selects RACH preamble #16 from RACH preamble set #B for example. A UE #1 sends the selected RACH preamble #1 and a UE #2 sends the selected RACH preamble #16 to the gNB. Note that although RACH preamble #1 transmission from the UE #1 and RACH preamble #16 transmission from the UE #2 are illustrated as separate ones in the figure, the RACH preamble #1 transmission from the UE #1 and the RACH preamble #16 transmission from the UE #2 can be transmitted in the same PRACH allocated at the same time-domain and frequency-domain. It may be assumed that the UE #1 and the UE #2 transmit RACH preamble #1 and RACH preamble #16 at the same PRACH allocated at the same time-domain and frequency-domain.

In one example, separate frequency resource and/or time resource sets for PRACH is configured by the gNB, e.g., PRACH frequency and/or time resource set #A and set #B, for two different cases where the UE has a valid GNSS UE location information (e.g., RACH frequency and/or time resource set #A) and the UE has not a valid GNSS UE location information (e.g., RACH frequency and/or time resource set #B). In such an example, if the UE has a valid GNSS UE location information, the UE selects one of PRACH occasions that belong to the configured PRACH frequency and/or time resource set #A while if the UE has not a valid GNSS UE location information, or the UE selects one of PRACH occasions that belong to the configured RACH frequency and/or time resource set #B. Once the gNB receives the preambles, the gNB generates the corresponding RAR MAC PDU for the received RACH preambles. It is noted that the MAC PDU includes one or more MAC subPDUs and optionally padding fields. Each MAC subPDU includes one of the following: (1) a MAC subheader with backoff indicator only; (2) a MAC subheader with RAPID only (i.e., acknowledgment for SI request); or (3) a MAC subheader with RAPID and MAC RAR.

In one example, a MAC subPDU including MAC subheader with RAPID and MAC RAR is mainly described in 3GPP standard specification (e.g., a MAC subPDU including MAC subheader with backoff indicator only or MAC subheader with RAPID only). The existing MAC subPDU format including MAC subheader with RAPID and MAC RAR is described in 3GPP standard specification.

When the gNB generates MAC subPDUs including MAC subheader with RAPID and MAC RAR insides of RAR MAC PDU, the gNB uses different MAC RAR format depending on the RACH preamble set that is associated with the received RACH preamble. In the aforementioned example, when the gNB generates MAC subPDU including MAC subheader with RAPID and MAC RAR for the received RACH preamble #1, the gNB uses MAC RAR format #1 since RACH preamble set for the received RACH preamble #1 is set #A, while when the gNB generates MAC subPDU including MAC subheader with RAPID and MAC RAR for the received RACH preamble #16, the gNB uses MAC RAR format #2 since RACH preamble set for the received RACH preamble #16 is set #B.

In one example, if separate frequency resource and/or time resource sets for PRACH, for example PRACH frequency and/or time resource set #A and set #B, is configured by the gNB for two different cases where the UE has a valid GNSS UE location information (e.g., RACH frequency and/or time resource set #A) and the UE has not a valid GNSS UE location information (e.g., RACH frequency and/or time resource set #B), when the gNB generates MAC subPDUs including MAC subheader with RAPID and MAC RAR insides of RAR MAC PDU, the gNB uses MAC RAR format #1 if the received RACH preamble was transmitted by the UE over PRACH resource set #A and MAC RAR format #2 if the received RACH preamble was transmitted by the UE over PRACH resource set #B. It is noted that if PRACH resources are different in the frequency-domain and/or time-domain, a corresponding RAR MAC PDU responding to RACH preambles sent by the UE is transmitted by a different scheduling information in DCI. For example, a corresponding RA-RNTI value to a PRACH resource or a set of PRACH resources is used in the scheduling of RAR MAC PDU transmission. It is noted that the RA-RNTI currently associated with the PRACH occasion (PRACH frequency and time resource) in which the random access preamble is transmitted, is computed as: RA-RNTI=1+s_id+14×t_id+14×80×f_id+14×80×8×ul_carrier_id.

In such example, s_id is the index of the first OFDM symbol of the PRACH occasion (0≤s_id<14), t_id is the index of the first slot of the PRACH occasion in a system frame (0≤t_id<80), where the subcarrier spacing to determine t_id is based on the value of μ specified in 3GPP TS 38.211, f_id is the index of the PRACH occasion in the frequency domain (0≤f_id<8), and ul_carrier_id is the UL carrier used for Random Access Preamble transmission (0 for NUL carrier, and 1 for SUL carrier).

Once RAR MAC PDU is generated, the gNB transmits the RAR MAC PDU to DL for the UEs who transmitted RACH preambles in the earlier corresponding PRACH channel. When the UE #1 receives RAR MAC PDU, the UE #1 adjusts UL TA based on the timing advance command (TAC) value according to the MAC RAR format #1. On the other hand, when the UE #2 receives RAR MAC PDU, the UE #2 adjusts UL TA based on the TAC value according to the MAC RAR format #2.

Figure 10:
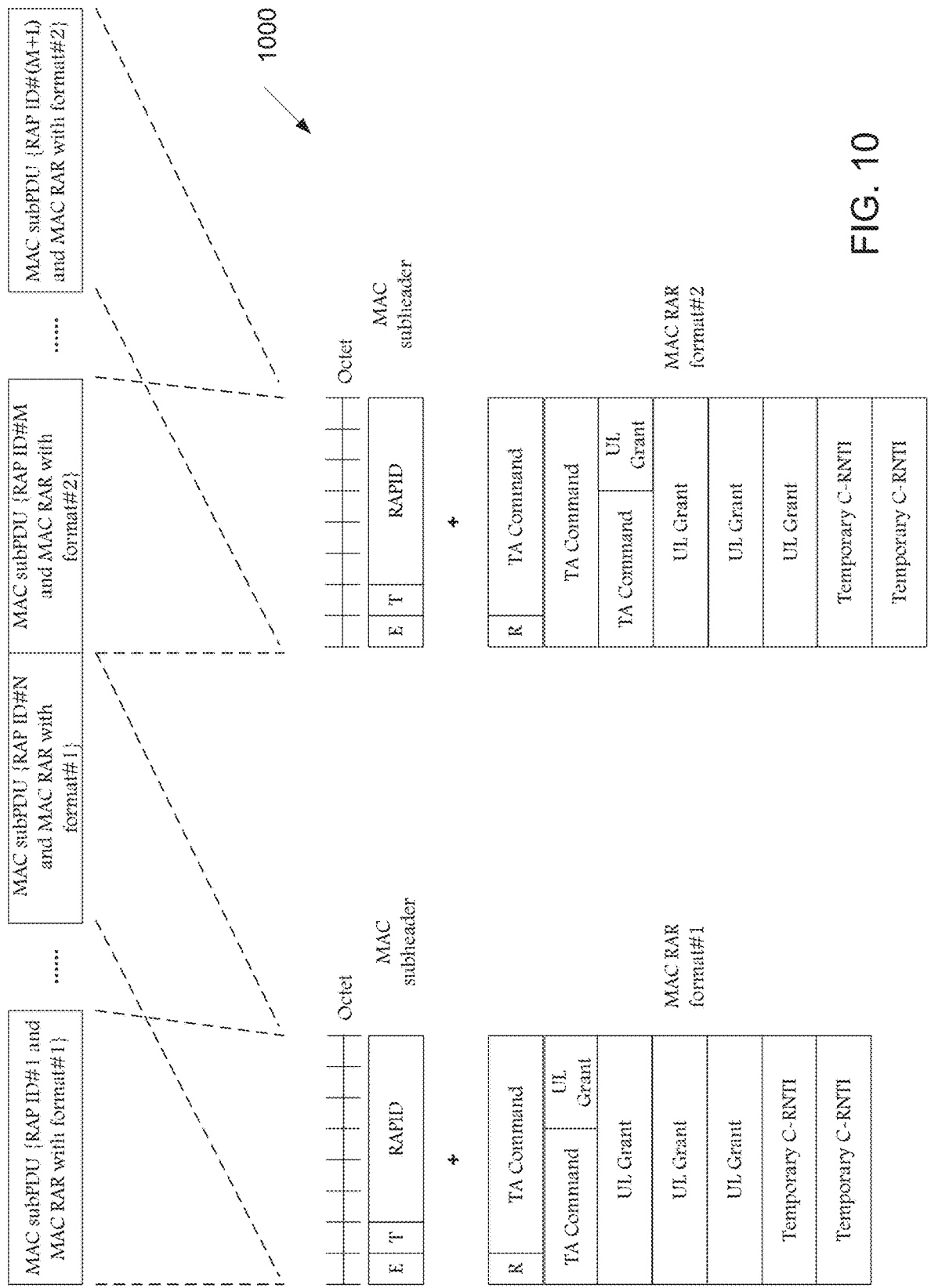
FIG. 10 illustrates an example MAC sub-PDU format in RAR MAC PDU according to embodiments of the present disclosure.

FIG. 10 illustrates an example MAC sub-PDU format in RAR MAC PDU 1000 according to embodiments of the present disclosure. An embodiment of the MAC sub-PDU format in RAR MAC PDU 1000 shown in FIG. 10 is for illustration only.

FIG. 10 illustrates one example of MAC subPDU including MAC subheader with RAPID and MAC RAR according to the example illustrated in FIG. 9. Note that multiple MAC subPDUs can be included into single MAC PDU. In the above example, MAC subPDU for any RACH preamble which belongs to RACH preamble set #A includes format #1 MAC RAR. In more details, if RAPID in MAC subheader in MAC subPDU indicates any RACH preamble which belongs to RACH preamble set #A (in the above example, RACH preamble #1 to RACH preamble #N), the corresponding MAC RAR has information according to format #1. On the other hand, MAC subPDU for any RACH preamble which belongs to RACH preamble set #B includes format #2 MAC RAR. In more details, if RAPID in MAC subheader in MAC subPDU indicates any RACH preamble which belongs to RACH preamble set #B (in the above example, RACH preamble #M to RACH preamble #(M+L)), the corresponding MAC RAR has information according to format #2.

A MAC subheader in MAC subPDU includes following fields: (1) an extension field (E): the extension field is a flag indicating if the MAC subPDU including this MAC subheader is the last MAC subPDU or not in the MAC PDU. The E field is set to "1" to indicate at least another MAC subPDU follows. The E field is set to "0" to indicate that the MAC subPDU including this MAC subheader is the last MAC subPDU in the MAC PDU; (2) a type field (T): the type field is a flag indicating whether the MAC subheader contains a random access preamble ID or a backoff indicator. The T field is set to "0" to indicate the presence of a backoff indicator field in the subheader (BI). The T field is set to "1" to indicate the presence of a random access preamble ID field in the subheader (RAPID); and (3) a random access preamble identifier field (RAPID): the random access preamble identifier field identifies the transmitted random access preamble. The size of the RAPID field is 6 bits. If the RAPID in the MAC subheader of a MAC subPDU corresponds to one of the random access preambles configured for SI request, MAC RAR is not included in the MAC subPDU.

A MAC RAR in MAC subPDU includes following fields: (1) a reserved field (R): R is a reserved bit and set to "0"; (2) a timing advance command field: the timing advance command field indicates the index value TA used to control the amount of timing adjustment that the MAC entity may apply in 3GPP standard specification. The size of the timing advance command field is 12 bits; (3) a UL grant field: the uplink grant field indicates the resources to be used on the uplink. The size of the UL grant field is 27 bits; and (4) temporary C-RNTI field: the temporary C-RNTI field indicates the temporary identity that is used by the MAC entity during random access. The size of the temporary C-RNTI field is 16 bits.

One example of the difference between a format 1 and a format 2 in MAC RAR can be length of TA command (TAC) fields because the UEs having no valid location information cannot estimate approximate TA based on UE location and satellite information (including satellite ephemeris, velocity, Do1, Do2, reference point (please see Do1, Do2 and reference point in the FIG. 8), etc.), so MAC RAR format #2 for those UEs needs wider range of TAC values that can cover quite long distance between the UE in the earth surface and the satellite in the high sky.

On the other hand, MAC RAR format #1 with the short range of TAC values works for the UEs having valid location information available because the UE can already adjust approximate TA that estimated based on UE location and satellite information. Note that satellite information can be provided by either system information or dedicated RRC message (e.g., RRC connection reconfiguration, etc.). Also, the difference in the number of bits for TAC field between a format 1 and a format #2 that is shown in the figure (format #2 has 8 bits more than format #1) is just an example and the difference does not exclude any other differences. Also note that MAC RAR format #1 and MAC RAR format #2 can have other difference than length of TAC field (e.g., adding new information to certain MAC RAR format, modification of existing fields to certain MAC RAR format, etc.).

Another example for the indication of new MAC RAR format is to use "R" field in MAC RAR. In more detail, if "R" is set to "0," "R" indicates MAC RAR format is format #1 while if "R" is set to "1," "R" indicates MAC RAR format is format #2.

In one example, the indication of new MAC RAR format is provided to use a different RA-RNTI in the scheduling of RAR MAC PDU. The different RA-RNTI in the scheduling of RAR is associated with a PRACH occasion or a set of PRACH occasions. If the associated PRACH occasion or set of PRACH occasions belong(s) to the RACH frequency and/or time resource set #A, the gNB uses MAC RAR format #1 in the corresponding RAR MAC PDU. If the associated PRACH occasion or set of PRACH occasions belong(s) to the RACH frequency and/or time resource set #B, the gNB uses MAC RAR format #2 in the corresponding RAR MAC PDU.

As illustrated in FIG. 10, MAC RAR format #2 can use the same length of TA command field as the MAC RAR format #1.

$$2^u \cdot 15 N_{TA} = T_A \cdot 16 \cdot 64 / 2^u$$

Figure 11A:
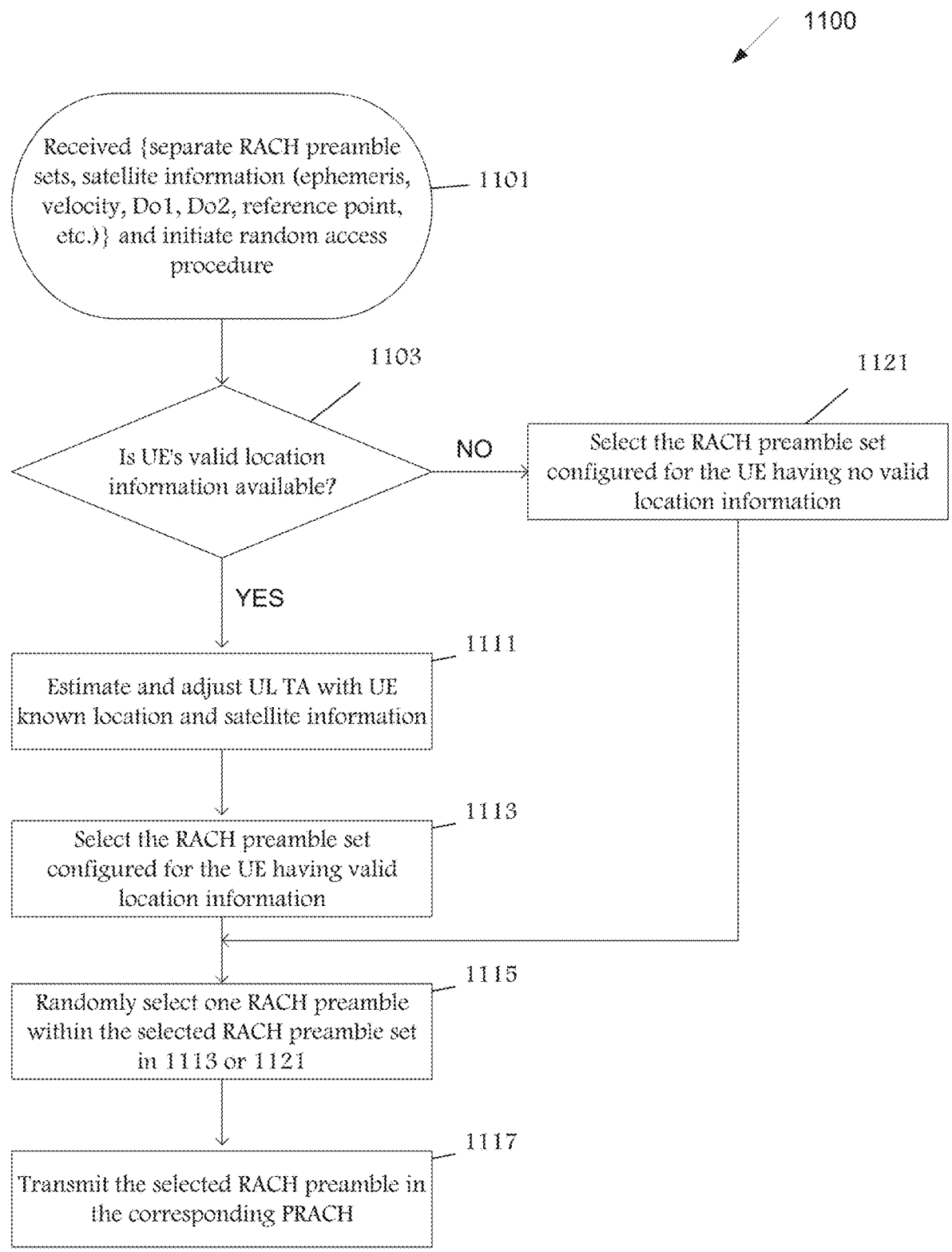
FIG. 11A illustrates a flow chart of a method for UE behavior in RACH preamble transmission according to embodiments of the present disclosure.

FIG. 11A illustrates a flow chart of a method 1100 for UE behavior in RACH preamble transmission according to embodiments of the present disclosure. For example, the method 1100 as may be performed by a UE such as 111-116 as illustrated in FIG. 1. An embodiment of the method 1100 shown in FIG. 11A is for illustration only. One or more of the components illustrated in FIG. 11A can be implemented in specialized circuitry configured to perform the noted functions or one or more of the components can be implemented by one or more processors executing instructions to perform the noted functions.

Figure 11B:
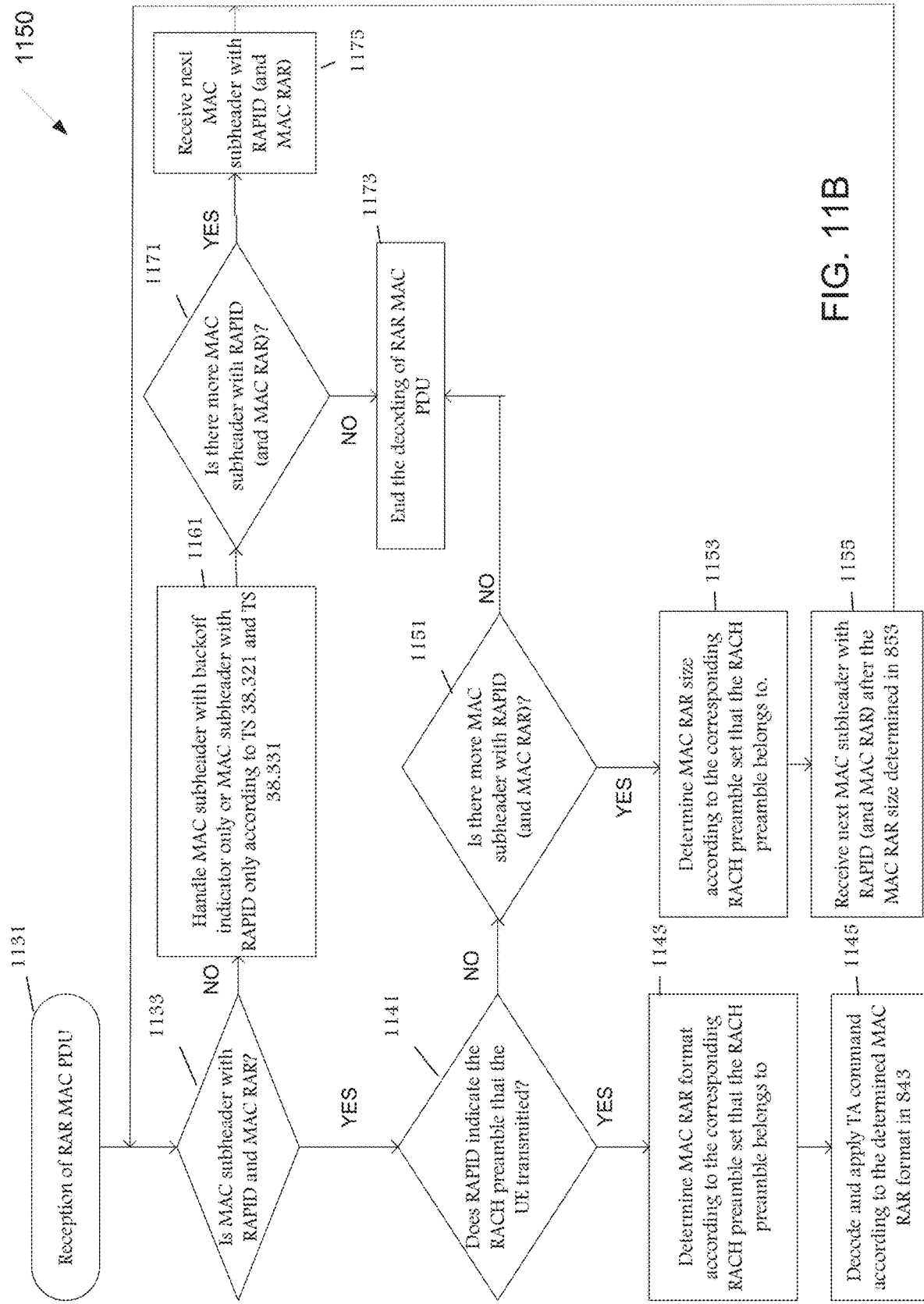
FIG. 11B illustrates a flow chart of a method for UE behavior in RAR MAC PDU reception according to embodiments of the present disclosure.

FIG. 11B illustrates a flow chart of a method 1150 for UE behavior in RAR MAC PDU reception according to embodiments of the present disclosure. For example, the method 1150 as may be performed by a UE such as 111-116 as illustrated in FIG. 1. An embodiment of the method 1150 shown in FIG. 11B is for illustration only. One or more of the components illustrated in FIG. 11B can be implemented in specialized circuitry configured to perform the noted functions or one or more of the components can be implemented by one or more processors executing instructions to perform the noted functions.

FIGS. 11A and 11B illustrates examples of the UE behaviours according to the example illustrated in FIGS. 9 and 10. A UE behaviour at RACH preamble transmission is described in FIG. 11A and a UE behaviour at RAR MAC PDU reception is described in FIG. 11B.

As illustrated in FIG. 11A, the UE received separate RACH preamble set configuration, satellite information (including satellite ephemeris, velocity, Do1, Do2, reference point (please see Do1, Do2 and reference point in FIG. 8 etc.) either by system information or by the dedicated RRC message (e.g., RRC connection reconfiguration, etc.) and initiate random access procedure (step 1101). If the UE has valid location information available (e.g., based on GNSS/GPS positioning), the UE estimates and adjusts UL TA based on UE known location and satellite information and selects the RACH preamble set that was configured for UEs having valid location information available (steps 1103, 1111, 1113).

If the UE has no valid location information (e.g., GNSS/GPS signalling is poor, GNSS/GPS signalling is not detected, etc.), the UE selects RACH preamble set that was configured for UEs having no valid location information (step 1103, 1121). Once the UE selects the corresponding RACH preamble set in step 1113 or 1121, the UE randomly selects one RACH preamble among the preambles which belong to the selected RACH preamble set (step 1115) and transmits the RACH preamble through the corresponding PRACH (step 1117).

In one example, separate frequency resource and/or time resource sets for PRACH are configured by the gNB, e.g., PRACH frequency and/or time resource set #A and set #B, for two different cases where the UE has a valid GNSS UE location information (e.g., RACH frequency and/or time resource set #A) and the UE has not a valid GNSS UE location information (e.g., RACH frequency and/or time resource set #B). In this example, if the UE has a valid GNSS UE location information, the UE selects one of PRACH occasions that belong to the configured PRACH frequency and/or time resource set #A. While if the UE does not have a valid GNSS UE location information, the UE selects one of PRACH occasions that belong to the configured RACH frequency and/or time resource set #B.

As illustrated in FIG. 11A, the UE behaviour is initiated by the reception of RAR MAC PDU (step 1131). The UE checks if MAC subheader with RAPID and MAC RAR is there in the MAC PDU (step 1133). If MAC subheader with RAPID and MAC RAR is in the MAC PDU, the UE checks if RAPID in the MAC subheader indicates the RACH preamble that the UE transmitted (step 1133, 1141). If RAPID in the MAC subheader indicates the RACH preamble that the UE transmitted, the UE determines MAC RAR format to be decoded, which is determined dependent to the corresponding RACH preamble format that the RACH preamble belongs to (step 1141, 1143). Once MAC RAR format is determined, the UE decodes and apply the TAC value that is interpreted according to the determined MAC RAR format (step 1145).

If RAPID in the MAC subheader does not indicate the RACH preamble that the UE transmitted, the UE checks if there is more following MAC subPDU or not (step 1151). This check can be done based on "E" field in MAC subheader. If "E" indicates this is the last MAC subPDU in the MAC PDU, it means no more following MAC subPDU. If "E" does not indicate this is the last MAC subPDU in the MAC PDU, the UE determines MAC RAR size according to the corresponding RACH preamble set that the RACH preamble belongs to (step 1153). The UE does not need to decode any actual field inside of MAC RAR because the field is not for this UE (RAPID does not indicate its own transmitted RACH preamble), however in order to receive the next MAC subPDU, the UE may know when MAC subheader of the next MAC subPDU is started.

The UE receives MAC subheader of the next MAC subPDU after the MAC RAR size determined in step 1153, and the UE checks if the next MAC subPDU includes MAC subheader with RAPID and MAC RAR (step 1155, 1133). If "E" indicates this is the last MAC subPDU in the MAC PDU, the UE ends further decoding of RAR MAC PDU (step 1151, 1173).

If MAC PDU or MAC subPDU does not include MAC subheader with RAPID and MAC RAR, the UE handles MAC subheader with backoff indicator only or MAC subheader with RAPID only according to 3GPP standard specification and checks if there is more following MAC subPDU or not (step 1133, 1161, 1171). This check can be done based on "E" field in MAC subheader. If "E" indicates this is the last MAC subPDU in the MAC PDU, it means no more following MAC subPDU. If "E" indicates this is the last MAC subPDU in the MAC PDU, the UE ends further decoding of RAR MAC PDU (step 1171, 1173).

If "E" does not indicate this is the last MAC subPDU in the MAC PDU, the UE receives next MAC subPDU and the UE checks if the next MAC subPDU includes MAC subheader with RAPID and MAC RAR (step 1171, 1175, 1133). In this case, since MAC subheader size is fixed and only MAC subheader without MAC RAR was received in 861, the UE can receive MAC subheader of the next MAC subPDU after the fixed sized MAC subheader.

Note that although FIG. 11B illustrates that the UE determines MAC RAR format and/or size based on the corresponding RACH preamble set which the RACH preamble belongs to as one example, as explained as another example, that determination can be done based on "R" field in MAC RAR. In more detail, if "R" is set to "0," "R" indicates MAC RAR format is format #1 while if "R" is set to "1," "R" indicates MAC RAR format is format #2.

In one example, the indication of new MAC RAR format is provided to use a different RA-RNTI in the scheduling of RAR MAC PDU. The different RA-RNTI in the scheduling of RAR MAC PDU is associated with a PRACH occasion or a set of PRACH occasions. If the associated PRACH occasion or set of PRACH occasions belong(s) to the RACH frequency and/or time resource set #A, the UE determines MAC RAR format #1 in the corresponding RAR MAC PDU. If the associated PRACH occasion or set of PRACH occasions belong(s) to the RACH frequency and/or time resource set #B, the UE determines MAC RAR format #2 in the corresponding RAR MAC PDU.

Also note that although FIGS. 9, 10, 11A, and 11B are based on the example separate RACH preamble sets are configured for UEs with valid location information available and UEs with no valid location information, it is also possible to configure separate PRACH channel allocated in the different time-domain and/or frequency-domain for UEs with valid location information available and UEs with no valid location information.

In this case, the UE selects the corresponding PRACH channel depending on whether the UE has valid location information or not and determines MAC RAR format and/or size depending on for which PRACH channel the RAR MAC PDU is responded. In more details, RAR MAC PDU is scheduled by RA-RNTI in PDCCH and calculation of RA-RNTI is associated with the certain PRACH channel, so when the UE receives the scheduling information with the certain RA-RNTI value, the UE can know the corresponding RAR MAC PDU is responding for which PRACH channel, then the UE also can know whether that PRACH channel was configured for UEs with valid location information or UEs with no valid location information, and the UE determines MAC RAR format and size in RAR MAC PDU accordingly.

Figure 12:
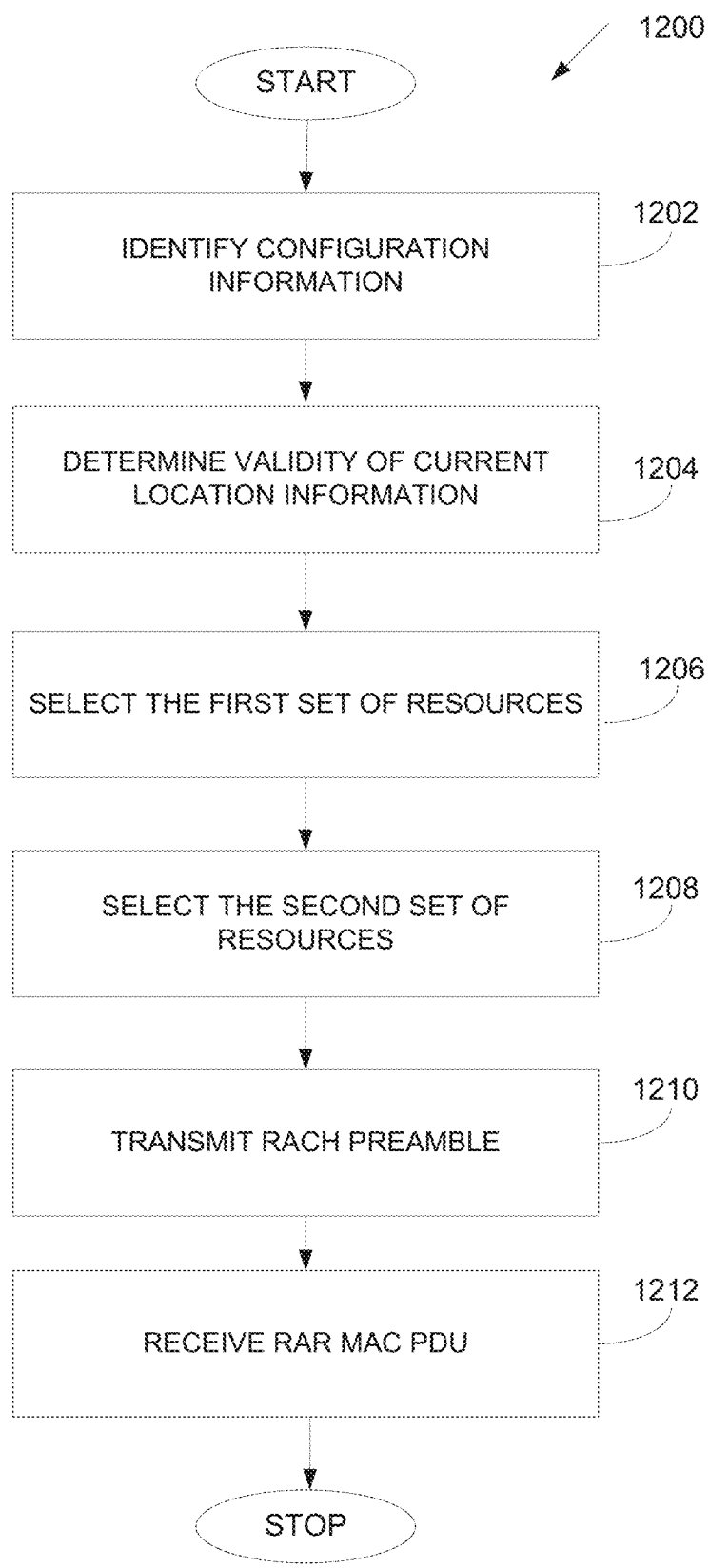
FIG. 12 illustrates a flow chart of a method for random access procedures in NTN according to embodiments of the present disclosure.

FIG. 12 illustrates a flow chart of a method 1200 for random access procedures in NTN according to embodiments of the present disclosure. For example, the method 1200 as may be performed by a UE such as 111-116 as illustrated in FIG. 1. An embodiment of the method 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

As illustrated in FIG. 12, the method 1200 begins at step 1202. In step 1202, the UE identifies configuration information including a first set of resources and a second set of resources for a RACH operation.

Subsequently, in step 1204, the UE determines whether current location information of the UE is valid for the RACH operation.

Subsequently, in step 1206, the UE selects the first set of resources based on a determination that the current location information of the UE is valid.

Subsequently, in step 1208, the UE selects the second set of resources based on a determination that the current location information of the UE is invalid.

Next, in step 1210, the UE transmits a RACH preamble on the selected first or second set of resources.

Finally, in step 1212, the UE receives, in response to transmitting the RACH preamble, a RAR MAC PDU. In step 1212, the RAR MAC PDU includes a MAC subPDU comprising a first format of MAC subPDU associated with the first set of resources and a second format of MAC subPDU associated with the second set of resources.

In Step 1212, the first format of the MAC subPDU includes a first length of a timing advance (TA) command field and the second format of the MAC subPDU includes a second length of a TA command field, and the second length of the TA command field is longer than the first length of the TA command field.

In one embodiment, a value of the TA command field in the first format of the MAC subPDU is identified using a first granularity and the value of the TA command field in the second format of the MAC subPDU is identified using a second granularity.

In one embodiment, the UE selects the RACH preamble from a first set of RACH preambles configured for the first set of resources or the RACH preamble from a second set of RACH preambles configured for the second set of resources.

In one embodiment, the UE selects a RACH frequency from a first set of RACH frequencies configured for the first set of resources or the RACH frequency from a second set of RACH frequencies configured for the second set of resources.

In one embodiment, the UE selects a RACH time instance from a first set of RACH time instances configured for the first set of resources or selects the RACH time instance from a second set of RACH time instances configured for the second set of resources.

In one embodiment, the UE determines whether a value of a RAPID field included in the MAC subPDU indicates the first set of resources or the second set of resources, decodes the first format of the MAC subPDU based on a determination that the value of the RAPID field included in the MAC subPDU indicates the first set of resources, and decodes the second format of the MAC subPDU based on a determination that the value of the RAPID field included in the MAC subPDU indicates the second set of resources.

In one embodiment, the UE determines whether a value of a R field included in the MAC subPDU indicates the first set of resources or the second set of resources, decodes the first format of the MAC subPDU based on a determination that the value of the R field included in the MAC subPDU indicates the first set of resources, and decodes the second format of the MAC subPDU based on a determination that the value of the R field included in the MAC subPDU indicates the second set of resources.

In one embodiment, the UE receives a PDCCH including a RA-RNTI that is used to schedule a reception of the RAR MAC PDU, determines whether the RA-RNTI included in the PDCCH indicates the first set of resources or the second set of resources, decodes the first format of the MAC subPDU based on a determination that the RA-RNTI indicates the first set of resources, and decodes the second format of the MAC subPDU based on a determination that the RA-RNTI indicates the second set of resources.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
a processor configured to:
identify configuration information including a first set of resources and a second set of resources for a random access channel (RACH) operation,
determine whether current location information of the UE is valid for the RACH operation,
select the first set of resources based on a determination that the current location information of the UE is valid, and
select the second set of resources based on a determination that the current location information of the UE is invalid; and
a transceiver operably coupled to the processor, the transceiver configured to:
transmit a RACH preamble on the selected first or second set of resources, and
receive, in response to transmission of the RACH preamble, a random access response (RAR) medium access control protocol data unit (MAC PDU) (RAR MAC PDU),
wherein the RAR MAC PDU includes a MAC subPDU comprising a first format of MAC subPDU associated with the first set of resources and a second format of MAC subPDU associated with the second set of resources.

2. The UE of claim 1, wherein the processor is further configured to:
   select the RACH preamble from a first set of RACH preambles configured for the first set of resources; or
   select the RACH preamble from a second set of RACH preambles configured for the second set of resources.

3. The UE of claim 1, wherein the processor is further configured to:
   select a RACH frequency from a first set of RACH frequencies configured for the first set of resources; or
   select the RACH frequency from a second set of RACH frequencies configured for the second set of resources.

4. The UE of claim 1, wherein the processor is further configured to:
   select a RACH time instance from a first set of RACH time instances configured for the first set of resources; or
   select the RACH time instance from a second set of RACH time instances configured for the second set of resources.

5. The UE of claim 1, wherein the processor is further configured to:
   determine whether a value of a RAPID field included in the MAC subPDU indicates the first set of resources or the second set of resources;
   decode the first format of the MAC subPDU based on a determination that the value of the RAPID field included in the MAC subPDU indicates the first set of resources; and
   decode the second format of the MAC subPDU based on a determination that the value of the RAPID field included in the MAC subPDU indicates the second set of resources.

6. The UE of claim 1, wherein the processor is further configured to:
   determine whether a value of a reserved (R) field included in the MAC subPDU indicates the first set of resources or the second set of resources;
   decode the first format of the MAC subPDU based on a determination that the value of the R field included in the MAC subPDU indicates the first set of resources; and
   decode the second format of the MAC subPDU based on a determination that the value of the R field included in the MAC subPDU indicates the second set of resources.

7. The UE of claim 1, wherein:
   the transceiver is further configured to receive a physical downlink control channel (PDCCH) including a random access-radio network temporary identification (RA-RNTI) that is used to schedule a reception of the RAR MAC PDU; and
   the processor is further configured to:
      determine whether the RA-RNTI included in the PDCCH indicates the first set of resources or the second set of resources,
      decode the first format of the MAC subPDU based on a determination that the RA-RNTI indicates the first set of resources, and
      decode the second format of the MAC subPDU based on a determination that the RA-RNTI indicates the second set of resources.

8. The UE of claim 1, wherein:
   the first format of the MAC subPDU includes a first length of a timing advance (TA) command field and the second format of the MAC subPDU includes a second length of a TA command field; and
   the second length of the TA command field is longer than the first length of the TA command field.

9. The UE of claim 1, wherein:
   a value of a timing advance (TA) command field in the first format of the MAC subPDU is identified using a first granularity, and
   the value of the TA command field in the second format of the MAC subPDU is identified using a second granularity.

10. A method of operating a user equipment (UE), the method comprising:
    identifying configuration information including a first set of resources and a second set of resources for a random access channel (RACH) operation;
    determining whether current location information of the UE is valid for the RACH operation;
    selecting the first set of resources based on a determination that the current location information of the UE is valid;
    selecting the second set of resources based on a determination that the current location information of the UE is invalid;
    transmitting a RACH preamble on the selected first or second set of resources; and
    receiving, in response to transmitting the RACH preamble, a random access response (RAR) medium access control protocol data unit (MAC PDU) (RAR MAC PDU),
    wherein the RAR MAC PDU includes a MAC subPDU comprising a first format of MAC subPDU associated with the first set of resources and a second format of MAC subPDU associated with the second set of resources.

11. The method of claim 10, further comprising:
    selecting the RACH preamble from a first set of RACH preambles configured for the first set of resources or the RACH preamble from a second set of RACH preambles configured for the second set of resources;
    selecting a RACH frequency from a first set of RACH frequencies configured for the first set of resources or the RACH frequency from a second set of RACH frequencies configured for the second set of resources; and
    selecting a RACH time instance from a first set of RACH time instances configured for the first set of resources or the RACH time instance from a second set of RACH time instances configured for the second set of resources.

12. A base station (BS) in a wireless communication system, the BS comprising:
    a processor configured to generate configuration information including a first set of resources and a second set of resources for a random access channel (RACH) operation; and
    a transceiver configured to:
       transmit the configuration information including the first set of resources and the second set of resources for the RACH operation,
       receive a RACH preamble on the first or second set of resources; and
       transmit, in response to receiving the RACH preamble, a random access response (RAR) medium access control protocol data unit (MAC PDU) (RAR MAC PDU),
    wherein the RAR MAC PDU includes a MAC subPDU comprising a first format of MAC subPDU associated with the first set of resources and a second format of MAC subPDU associated with the second set of resources, and wherein the first set of resources is for when current location information of a user equipment (UE) is valid and the second set of resources is for when the current location information of the UE is invalid.

13. The BS of claim 12, wherein:
the RACH preamble is from a first set of RACH preambles configured for the first set of resources; or
the RACH preamble is from a second set of RACH preambles configured for the second set of resources.

14. The BS of claim 12, wherein:
a RACH frequency is from a first set of RACH frequencies configured for the first set of resources; or
the RACH frequency is from a second set of RACH frequencies configured for the second set of resources.

15. The BS of claim 12, wherein:
a RACH time instance is from a first set of RACH time instances configured for the first set of resources; or
the RACH time instance is from a second set of RACH time instances configured for the second set of resources.

16. The BS of claim 12, wherein:
the processor is further configured to generate the MAC subPDU including a value of a RAPID field, the value of the RAPID field included in the MAC subPDU indicating the first set of resources or the second set of resources;
the first format of the MAC subPDU is decoded based on that the value of the RAPID field included in the MAC subPDU indicates the first set of resources; and
the second format of the MAC subPDU is decoded based on that the value of the RAPID field included in the MAC subPDU indicates the second set of resources.

17. The BS of claim 12, wherein:
the processor is further configured to generate the MAC subPDU including a value of a reserved (R) field, the value of the R field included in the MAC subPDU indicates the first set of resources or the second set of resources;
the first format of the MAC subPDU is decoded based on that the value of the R field included in the MAC subPDU indicates the first set of resources; and
the second format of the MAC subPDU is decoded based on that the value of the R field included in the MAC subPDU indicates the second set of resources.

18. The BS of claim 12, wherein:
the transceiver is further configured to transmit a physical downlink control channel (PDCCH) including a random access-radio network temporary identification (RA-RNTI) that is used to schedule a reception of the RAR MAC PDU, the RA-RNTI included in the PDCCH indicating the first set of resources or the second set of resources;
the first format of the MAC subPDU is decoded based on that the RA-RNTI indicates the first set of resources; and
the second format of the MAC subPDU is decoded based on that the RA-RNTI indicates the second set of resources.

19. The BS of claim 12, wherein the processor is further configured to generate the first format of the MAC subPDU including a first length of a timing advance (TA) command field and the second format of the MAC subPDU including a second length of a TA command field, the second length of the TA command field being longer than the first length of the TA command field.

20. The BS of claim 19, wherein:
a value of a timing advance (TA) command field in the first format of the MAC subPDU is identified using a first granularity, and
the value of the TA command field in the second format of the MAC subPDU is identified using a second granularity.

* * * * *